United States Patent
De Ruiter et al.

(10) Patent No.: US 6,300,276 B1
(45) Date of Patent: Oct. 9, 2001

(54) GRANULAR ACTIVATED CARBON FROM DISTILLATION RESIDUES

(75) Inventors: Ernest De Ruiter, Leverkusen; Jost Heiner Kames, Haan; Gerhard Heuberger, Duesseldorf, all of (DE)

(73) Assignee: MHB Filtration GmbH & Co. KG, Erkrath (DE)

( * ) Notice: Subject to any disclaimer, the term of this patent is extended or adjusted under 35 U.S.C. 154(b) by 0 days.

(21) Appl. No.: 09/242,727

(22) PCT Filed: Aug. 14, 1997

(86) PCT No.: PCT/EP97/04459

§ 371 Date: Jun. 25, 1999

§ 102(e) Date: Jun. 25, 1999

(87) PCT Pub. No.: WO98/07655

PCT Pub. Date: Feb. 26, 1998

(30) Foreign Application Priority Data

| Aug. 20, 1996 | (DE) | 19633437 |
| Aug. 23, 1996 | (DE) | 19634115 |
| Dec. 5, 1996 | (DE) | 19650414 |
| Dec. 20, 1996 | (DE) | 19653238 |

(51) Int. Cl.[7] ................................ C01B 31/08

(52) U.S. Cl. ............................. 502/437; 502/423

(58) Field of Search .................... 588/215, 216; 502/423, 437

(56) References Cited

U.S. PATENT DOCUMENTS 3,994,829 * 11/1976 Alford .................................. 423/151
5,405,593 * 4/1995 Knudson ......................... 423/244.03

* cited by examiner

Primary Examiner—Stuart L. Hendrickson
(74) Attorney, Agent, or Firm—Crowell & Moring LLP

(57) ABSTRACT

A process for producing activated carbon granules in which (a) a mixture of distillation residues from isocyanate production, a carbon-containing processing auxiliary substance, and optionally one or more other additives is shaped into flowable granules; (b) the resulting granules are then carbonized at low temperatures, and (c) the carbonized product is activated. The activated carbon granules produced in this way can be used to manufacture adsorbent substrate structures loaded with this product, in particular adsorption filters, filter mats, odor filters, surface filters for protective suits against chemical poisons, and ambient air purifying filters.

26 Claims, No Drawings

GRANULAR ACTIVATED CARBON FROM DISTILLATION RESIDUES

BACKGROUND OF THE INVENTION

The present invention relates to a method for the production of granular and especially spherical active carbon and to the use of the active carbon granules or spherules for various purposes.

Active carbon, due to its quite unspecific adsorptive properties, is the most-used adsorber. Legal requirements, but also increasing awareness of responsibility for the environment, are leading to a growing demand for active carbon.

Active carbon is generally obtained by low-temperature carbonization (pyrolysis) followed by activation of compounds containing carbon, those compounds being preferred which result in yields at reasonable cost, since the weight losses due to the elimination of volatile components during carbonization and to burn-off during activation are considerable.

But also the nature of the active carbons produced, whether finely or roughly porous, strong or brittle, depends on the starting material; common starting materials include coconut shells, wood wastes, peat, coal, tars, but also and especially plastics, which among other things play a certain part in the production of active carbon fabrics.

Active carbon is used in various forms: carbon powder, granular carbon, molded carbon, and, since the end of the seventies, spherical carbon. Spherical active carbon has a number of advantages over powder, split carbon and granular carbon, which makes it valuable or even indispensable for certain applications. Due to its special shape, but also due to its extremely high resistance to abrasion, spherical carbon is much in demand for special fields of application, such as surface filters for protective clothing against chemical poisons and filters for low concentrations of toxins in large amounts of air, for example. In charging reticulated, large-pore polyurethane foams with active carbon according to German DE-A1-38 13 563, only a free-flowing carbon is used when the inner layers of the foam material are also to be optimally filled. In the production of protective clothing against chemical toxins in line with DE-C3-33 04 349, only a very highly abrasion resistant carbon can be used, and only spherical carbon satisfies this requirement.

Spherical carbon is today produced mostly by a multiple-step and therefore very expensive, method. For example, in line with U.S. Pat. No. 1,468,982, the spherical carbon is made exclusively from bitumen in a multi-stage process. This multi-stage process is very expensive and the accordingly high price of this spherical carbon forestalls many applications in which it would be preferred on account of its properties.

It is therefore not surprising that various attempts have been made to produce a usable spherical carbon by another method.

Known in the state of the art is the low-temperature carbonization and activation of new or used ion exchangers which contain sulfone groups and the low-temperature carbonization of its intermediates in the presence of sulfuric acid, wherein the sulfone groups and/or sulfuric acid serve as crosslinkers. Such processes are described in DE-A-1-43 28 219 and in DE-A1-43 04 026, as well as in DE-A1-196 00 237, including the application for patent of addition DE 196 25 069.2. In these processes, however, particularly the large amounts of sulfur dioxide that are given off (about 1.5 kg $SO_2$ per kg of end product), and the corrosion problems which it entails, are disadvantageous and problematical, so that possibilities for crosslinking other than by sulfuric acid appear desirable. In crosslinking with sulfuric acid, the yield is about 50% of the organic or polymeric material, regardless of whether the starting products are unsulfonated intermediates of ion exchangers or finished cation exchangers; and it is advantageous to promote crosslinking by slight air oxidation during the low-temperature carbonization and to facilitate subsequent activation, so that the formation of pseudographitic zones is suppressed.

EP-A-0 480 255 describes an agglomeration process for making a catalyst composed of carbon and nitrogen, wherein a loose carbon or active carbon powder is granulated together with polymerizable isocyanates. The isocyanates, in contrast to the present invention, are used only as "glue" or "adhesive," so to speak, in order to bond the initially loose carbon powder particles together, but not as starting substance for the carbon itself, as is the case in the present invention. Especially, the process according to EP-A-0 480 255 will not lead to spherules because the agglomeration is uncontrolled; any departure from the spherical form, however, necessarily results in lower resistance to abrasion. In contrast to EP-A-0 480 255, however, in the low-temperature carbonization and activation the teaching of the present application sets out from granular, especially spherical particles which largely retain their shape during the process. Also, in contrast to the present invention, according to EP-A-0 480 255 a product with a relatively large pore diameter of more than 100 nm is produced, due to the agglomeration, which consequently has no micropores at all, and due to its low BET surface area and its unfavorable ratio of pore volume to pore wall surface, also has poor adsorption properties and is entirely unsuitable for this purpose. Instead, the product of EP-A-0 480 255 is intended for use as catalyst. Also, due to its high graphite content of at least 90 wt.-%, which may indeed be necessary for catalysis, but not for adsorption, the products of EP-A-0 480 255 are entirely unsuitable for adsorption.

SUMMARY OF THE INVENTION

The object of the present invention is to provide a method for the production of high-quality, granular, especially spherical active carbon which avoids the disadvantages of the methods of the prior art.

Thus, one purpose of the present invention is to find novel starting materials for the production of spherical carbon, which will permit an economically acceptable conversion to granular, especially spherical active carbon, also on an industrial scale.

It is important that the starting material for the low-temperature carbonization must not sinter together during carbonization, so that thereafter an economically reasonable amount of residue will be had, and that this residue will be able to be activated to make active carbon. All this calls for strong crosslinking, which not only makes the starting material infusible but also "freezes," so to speak, the cavities which are formed by the elimination of volatile components and which have distances between their walls of often just a few Ångströms. Especially important is crosslinking at temperatures lower than 400° C., in order to obtain the highest possible proportion of pyrolysis residue.

As the Applicant's research has now shown, suitable starting materials for the production of granular, preferably spherical, active carbon are residues, such as are produced in the chemical industry, especially distillation residues, while such starting materials must satisfy the following conditions to enable good yields of active carbon to be achieved:

The starting materials are to already contain compounds with aromatic carbons and/or easily aromatizing compounds.

Reactive groups and/or compounds must be present in the starting material or at least must be introduced, which lead to crosslinking beginning at 200° C., especially beginning at 300° C. It is to be understood, according to the invention, that such reactive groups or compounds include, for example, the groups —OH, —CHO, reactive —CH$_3$, —NCO and halogen compounds such as CH$_2$Cl$_2$. The isocyanate group is especially preferred as the reactive group.

After the crosslinking, it must be possible to still eliminate volatile substances in order to form the necessary pore system, which is prevented from collapsing, i.e., caving in, by the crosslinking that has taken place.

The Applicant's studies have now shown that particularly distillation residues from the production of diisocyanates satisfy the requirements stated above.

The Applicant therefore has now found that the object of the invention can surprisingly be achieved by a method for the production of granular, especially spherical, active carbon, which comprises the following steps:

(a) Processing a distillation residue originating in the production of diisocyanates, into which a processing adjuvant containing carbon is mixed, as well as optionally one or more additional additives, to make free-flowing granules, especially spherules, (b) subsequently low-temperature carbonizing the granules or spherules obtained in this manner, (c) and finally, activating the carbonized product.

Thus, the present invention relates equally to a method for the disposal and recycling of distillation residues from diisocyanate production, which otherwise would have to be disposed of in an expensive manner. The importance of the method of the invention becomes clear if one considers that in the year 1985, for example, the world production only of toluene diisocyanates was estimated at 748,000 metric tons.

DETAILED DESCRIPTION OF PREFERRED EMBODIMENTS

It was unexpectedly found that distillation residues which are produced in the preparation of isocyanates, especially aromatic diisocyanates, are a good starting material for a high-quality, abrasion-resistant spherical carbon. Examples of this are distillation residues from the production of toluene disocyanates (toluylene diisocyanates, TDI) or of 4,4'-methylene di-(phenyl isocyanates) (diphenylmethane diisocyanates, MDI). Distillation residues, for example, from the production of 1,5-naphthalene diisocyanates are also suitable.

The distillation residue used in the method of the invention generally has a high content of aromatic nuclei and a nitrogen content of at least approximately 10 wt.-%. The nitrogen content in the distillation residue preferably lies in the range from about 10 wt.-% to about 20 wt.-%. The ratio of aromatic carbon atoms to the total number of carbon atoms in the distillation residue $C_{aromat}/C_{total}$ is generally between 0.6 and 0.9, preferably above 0.7, and especially above 0.8.

For example, the starting mixture of step (a) can contain about 10 wt.-% to about 85 wt.-% of an aromatic diisocyanate derivative.

Isocyanates are generally produced by reacting the corresponding amines with phosgene in an appropriate solvent, and multi-stage purification by distillation. A distillation residue remains, which comprises a mixture substantially of heavy hydrocarbons, no longer distillable isocyanates, and oligomers or polymers derived from isocyanates. A process for the production of isocyanates and working up the residue is described for example in EP-A200 548 685, the content of which is incorporated herein in full by reference.

For better handling, there is added to the distillation residue from isocyanate production a certain amount of a working adjuvant containing carbon, which is selected from among high-boiling hydrocarbons and hydrocarbon mixtures such as bitumen and asphalts, tars (e.g., residues from coal tar distillation, binder pitch or coal tar pitch), thermoplastic polymers (preferably those which contain aromatic rings), distillation residues from petroleum processing, and mixtures of the above-named carbon-containing working adjuvants. The carbonaceous working adjuvant is preferably selected so as to be inert under the distillation conditions of isocyanate production. The preferred carbonaceous working adjuvant is bitumen. Very especially preferred are bitumens, e.g., of type B 80, B 80 E, type B 300 or B 300 E (designations according to DIN 52010).

Preferably, the addition of the carbonaceous working adjuvant takes place during the distillative purification of the distillation residue from diisocyanate production. For example, the distillation residue obtained at the end of the production of diisocyanates can be fed into a heated tank with stirrer, which is partially filled with the carbonaceous working adjuvant (e.g., bitumen), after which the content of free isocyanates still present in the residue can be distilled out and the remaining residue can be emptied out and cooled in the form of a crumbly, free-flowing mass, as is described in detail in EP-A-0 548 685. The reactor with stirrer can be a normal reactor with a heating jacket, which is normally suitable for high-pressure steam; other heating means can also, of course, be employed. This reactor should also have a large-size vapor discharge for the isocyanate to be distilled out, as well as inlet and auxiliary devices. Likewise, it should be equipped with a wall-running stirrer such as is called for in the literature for highly viscous products, anchor stirrers and spiral stirrers being preferred. Preferably, this reactor is operated at a temperature of 150° C. to 280° C., especially 180° C. to 230° C., and at a pressure of 2 mbar to 30 mbar, preferably 10 mbar to 20 mbar. Preferably the distillation is performed out of a stirred sump container, followed by an appropriate condenser system, the reactor being first charged with the carbonaceous working adjuvant before performing the distillation. Further technical details on this are given in EP-A-0 548 685.

The amount used of carbonaceous working adjuvant in the starting mixture of step (a) can be, for example, about 5 wt.-% to about 50 wt.-%.

Furthermore, one or more additives can be added to the starting mixture of distillation residue and carbonaceous working adjuvant. These can be, as it will be shown in detail below, the following additives, for example: water, emulsifier(s), inorganic materials such as inorganic adsorption materials; plastics, plastics wastes and polymers, catalytically active metal compounds, etc. Of course, still other additives familiar to one skilled in the art can be added if they can be uniformly incorporated into the mixture of step (a), and do not have a disturbing influence on the subsequent carbonizing and activation. The addition of the additive or additives is performed preferably together with the addition of the carbonaceous working adjuvant, i.e., in the preparation and work-up of the distillation residue from the diisocyanate production.

For example, by adding water to the starting mixture in step (a) a portion of the isocyanate can already be crosslinked. At least part of the added water can be present already in the carbonaceous working adjuvant, for example bitumen. For example, the water present in the starting mixture of step (a) can amount to several percent, e.g., about 2 wt.-% to about 10 wt.-%.

Also, at least one emulsifier can be added to the starting mixture in step (a), especially for better absorption of water. The emulsifier may already be present in the carbonaceous working adjuvant.

Furthermore, an inorganic material, especially an adsorber, can be added to the starting mixture of step (a). This inorganic material is preferably selected from silicon dioxides, silica compounds, bleaching earth, molecular sieves or aluminum oxides. Bentonites and silica can also be used as inorganic adsorbers, but other adsorbers are also available to one skilled in the art, if they can be incorporated into the isocyanate-bitumen mixture.

The inorganic material can be impregnated, for example, with a catalytically active component, preferably a compound of a catalytically active metal.

The content of inorganic material in the end product can amount to about 20 wt.-% to about 80 wt.-%, preferably about 30 wt.-% to about 60 wt.-%.

It has been found that, for example, by incorporating about 10 wt.-% to about 20 wt.-% of inorganic powdered adsorbents to a mixture of bitumen and diphenyl methane polyisocyanate, a material is obtained from which a spherical adsorber with special properties can be prepared. An interesting property to be mentioned is a high absorbency for water. Even at about 50 wt.-% moisture, the spherules are still free-flowing. In the extreme case they can absorb up to about 100 wt.-% of water.

Furthermore, the admixture of inorganic materials, especially adsorbers, leads to improved specific properties of the end product as regards adsorption, and endows it with catalytic properties.

Lastly, plastics and/or polymers, polystyrene for example, preferably granulated polystyrene or polystyrene waste, can be added to the starting mixture of step (a). The plastics and/or polymers can be added in amounts of about 10 wt.-% to about 30 wt.-%. If plastics, plastics waste or polymers are added to the starting mixture of step (a), then the foreign material in the mixture (i.e., everything that is not an isocyanate distillation residue) can amount to as much as 60 wt.-% of the total weight of the starting mixture of step (a).

Since according to the method of the invention, waste plastics can be co-processed, the present invention in this case equally applies to a method for the disposal and recycling of waste plastics, especially polystyrene wastes.

After the distillation residue has been made easier to handle, through the addition of a carbonaceous working adjuvant (e.g., bitumen or binder pitch) and in some cases at least one additional additive, it is processed to free-flowing granules and/or spherules.

This processing can be performed by extrusion followed by pelleting; such processes are known in the pharmaceutical industry, for example.

As an alternative, the processing of the mixture to free-flowing granules can also be performed in step (a) by the action of shear forces on the mixture, especially by stirring, as viscosity increases; thus, for example, in a stirring reactor, the distillation residue originating from isocyanate production can be stirred after the working adjuvant containing carbon, bitumen for example, has been added, until a crumbly mass of granular, especially spherical particles, is obtained. For this purpose it is possible, as described in the preceding text and in detail in EP-A-0 548 685, to introduce the residue obtained from the distillation process of diisocyanate production into a tank equipped with stirrer and heater, which has been partially filled with carbonaceous working adjuvant, and then distill out any free isocyanates still present in the residue, and obtain a free-flowing solid in the form of a crumbly, free-flowing mass which then can be removed and cooled.

The free-flowing grains and spherules obtained in this manner generally have diameters ranging from about 0.1 mm to about 2.5 mm. Typical sphere diameters amount to about 0.6 mm to about 1.5 mm. The density of the grains and spherules can amount, for example, to about 1.1 g/cm$^3$, resulting in a bulk weight of about 850 grams per liter.

The amazing thing is that these spheres of isocyanate polymer and pitch can be easily carbonized at low temperature in a rotary kiln, for example, without caking up. In the same rotary kiln, the activation can then be performed. That is to say, the carbonization and activation can be performed in the same apparatus, and for example transition from the one directly to the other, which constitutes an additional great advantage of the process of the invention.

The low-temperature pyrolysis or carbonation in step (b) of the process of the invention can be performed in an inert or slightly oxidizing atmosphere at temperatures up to about 800° C., preferably up to about 750° C., and especially up to about 700° C. The carbonization can be performed, for example, in a rotary kiln, in a fluidized bed, or in special ovens, such as tubular furnaces, story furnaces, auger furnaces, etc.

Care should be taken to see, however, that sufficient time is allowed, especially below about 250° C., for crosslinking (i.e., for hardening or rendering infusible). Here the addition of some air is also necessary for the crosslinking. During the crosslinking, i.e., the process for rendering the viscous-flowing residues infusible, the mass should be kept constantly in motion to prevent clumping.

For example, the carbonization can be performed in a predominantly inert atmosphere ($N_2$, for example) which contains about 0.2 vol.-% to about 4 vol.-% of oxygen. The driving off of volatile components is largely ended at about 450° C. Beginning at about 600° C. it can be advantageous to add some steam to counteract premature graphitization.

During the carbonization step, internal surface areas can be attained, of up to about 500 m$^2$/g.

The activation in step (c) of the process of the invention is performed, in a manner known to the man of the art, at temperatures from about 700° C. to about 900° C., preferably in the range of about 800° C. to about 850° C., air, $CO_2$ or steam being preferably blown in.

For example, in the steam activation of the predominantly inert atmosphere, steam can be added in an amount of about 3 vol.-% to about 50 vol.-%. Thus, for example, activation can be performed with about 25 vol.-% to about 35 vol.-% of steam in $N_2$.

Although it is unnecessary, the spherules to be carbonized and activated can be dusted prior to carbonization and activation with a small amount of carbon powder, preferably a powder from coal or active charcoal, for example in amounts of about 0.5 wt.-% to about 5 wt.-%, in order to provide a reliable safeguard against possible caking during the carbonization, for example in a rotary kiln. The carbon powder can be added, for example, when the rotary kiln is filled and distributes itself quickly and coats the surface with a "dry" covering in case some spherules might unexpectedly become sticky.

During the carbonization and activation the spherical shape of the starting materials is preserved. That is to say, the particle size of the end product can be determined and controlled, which is another advantage of the process of the invention.

By the method of the invention, extremely useful, high-quality, abrasion-resistant active carbon spherules are obtained in good yields, mostly from wastes that must be disposed of, namely distillation residues and in some cases waste from plastics, which must otherwise be disposed of, particularly by burning, or stored. Precisely in times of growing environmental consciousness, a special merit of the present invention is to be seen in this. Thus, subject matter of the present invention is equally a method for the disposal and recycling of waste materials, especially distillation residues and in some cases waste plastics.

Likewise subject matter of the present invention are active carbon spherules of great strength, especially resistance to abrasion, which can be produced by the method of the invention. This granular, especially spherical carbon is characterized by the fact that the total pore volume ranges from approximately 0.5 ml/g to about 1.3 ml/g, and to a substantial extent of micropores of less than 1 nm (10 Å) in diameter, preferably ranging from about 0.2 nm (2 Å) to about 1 nm (10 Å), especially ranging from about 0.3 nm (3 Å) to about 0.7 nm (7 Å). A person skilled in the art, however, knows that pore volume, pore diameter and pore distribution vary according to the degree of activation. Thus, by selecting the activation conditions it is possible to control the surface structure and pore structure of the end product.

The adsorption product made by the method of the invention has a particle diameter ranging from about 0.1 mm to about 2.0 mm, preferably from about 0.2 mm to about 1.0 mm. The internal surface area (BET) of the particles ranges from about 600 $m^2/g$ to about 1500 $m^2/g$, preferably from about 900 $m^2/g$ to about 1200 $m^2/g$.

The adsorption materials made according to the invention have great resistance to abrasion. In the case of a diameter of about 0.5 mm, the active carbon grains or spherules can withstand at least a force of about 5 N, preferably of about 10 N.

The active carbon spherules made by the method of the invention exhibit good to excellent adsorption properties. It has furthermore been found that, in comparison with normal active carbon, they have an elevated affinity for acid gases, which is to be ascribed to the nitrogen incorporated in the aromatic systems. The active carbon spherules made according to the invention are therefore especially suitable as adsorption materials due to the great number of their properties considered overall.

The active carbon product obtained by the method of the invention can include a catalytically active component, preferably a compound of a catalytically active metal. Such materials can be prepared, for example, by incorporating inorganic adsorption materials (e.g., silica gel, aluminum oxide, etc.) into the initial mixture of step (a), because due to their pronounced hydrophilic character these adsorption materials can be well impregnated with catalytically active metal compounds. The impregnation made in this manner is also well distributed and accessible inside of the active carbon spherules. The pore structures of the active carbon remain largely accessible because they are not plugged by the impregnation. Of course, as an alternative the end product of the method of the invention can be impregnated with the catalytically active component.

Also considerable is the extraordinarily high capacity of the active carbon spherules made by the method of the invention for the absorption of water, especially when they include inorganic adsorption materials. These can absorb up to about 50 wt.-% of water, preferably even up to about 100 wt.-% of water, a high proportion of which can be released again at a relative humidity RH=50%.

The large water absorbing capacity of the active carbon made according to the invention opens new possibilities. Thus, with the moisture stored or absorbed in the active carbon spherules can cure polyisocyanate glues which are crosslinked by moisture, and can do so without heating, in order thus to affix the active carbon spherules to heat-sensitive supporting structures. Working example 6 illustrates this possibility for use of the active carbons made by the invention.

For example, DE-A-38 13 563 describes adsorption filters with a high permeability to air, and very good kinetics, wherein granular adsorbers with particle sizes of about 1 mm or less can be fixed on a three-dimensional, open-pore support matrix by means of a thermosetting adhesive; curing the adhesive requires a heat treatment which many supports cannot withstand because they shrink when heated.

By the use of the active carbon spherules made according to the invention together with adhesives composed of polymeric isocyanates which crosslink by the action of moisture without heating, it is possible to charge adsorbers onto supporting structures which are not very stable thermally, because the active carbon spherules made according to the invention release water to the polyisocyanate adhesive which crosslinks without subsequent heating. Of course, the fixation of the active carbon spherules made by the invention onto the supporting structure can also be performed with other adhesives and cements familiar to one skilled in the art.

Subject matter of the present invention is thus also the use of the active carbon spherules or granules of the invention for the production of adsorption materials, as for example adsorption filters, filter mats, odor filters, surface filters for protective suiting against chemical toxins and filters for cleaning indoor air. The materials manufactured according to the invention can consequently be used for the production of adsorptive supporting structures, which are charged with them.

The following examples illustrate the present invention, but without limiting it. Upon reading the examples other embodiments will suggest themselves to one skilled in the art without thereby departing from the scope of the present invention.

EXAMPLE 1

An oligomeric distillation residue of diisocyanate production with a $C_{aromatic}/C_{total}$ ratio of about 0.8 and a high isocyanate content (approximately 15 wt.-% N) was mixed with bitumen, which contains 5 wt.-% of water, in a ratio of 5:1. The viscid mass was extruded into strands of about 0.8 mm diameter and pelletized with a Marumerizer with the addition of about 2 wt.-% of powdered charcoal to form substantially spherules of about 0.8 mm to about 1.5 mm diameter.

The spherules were then raised within 2 hours to 300° C. in a laboratory rotary kiln made by Plecq, in the presence of air so that they became infusible, and they were raised to 750° C. under nitrogen in two hours. A weight loss of about 50% resulted. The pyrolyzed product was activated in nitrogen for 2 hours at 850° C. with 25 vol.-% of $H_2O$. This resulted in another weight loss of about 30%, so that the yield of active carbon was about 20%. The spherical active carbon had a bulk weight of 520 g/l, a diameter of about 0.5 mm to about 1.0 mm, and a specific surface area of 1150 g/m$^2$ (BET method).

EXAMPLE 2

Polystyrene granules were melted with half the amount of bitumen and mixed with slight heating with an equal amount of the oligomeric residue of Example 1 containing isocyanate. The rest of the procedure was as in Example 1. The yield of active carbon was about 16%.

EXAMPLE 3

25 parts of polystyrene wastes were melted in 25 parts of coal tar pitch and 50 parts of distillation residue from the production of diphenyl methane diisocyanate. The mass was extruded hot and formed with a Marumerizer into spherules with diameters of 0.3 mm to 2.0 mm. The pyrolysis was performed in a 20-liter rotary kiln manufactured by Plecq. The temperature was raised in 60 minutes to 150° C. in a nitrogen atmosphere with the addition of about 10% air and this temperature was maintained for 60 minutes. Beginning at 600 ° C., about 5% of steam was added. The pyrolysis residue was 40%, the bulk weight was about 910 g/l. The activation was performed in nitrogen in the same rotary kiln at 850° C. with 25% steam, for 120 minutes. A high-quality, abrasion-resistant spherical carbon was obtained with an internal surface area (BET) of about 1250 m$^2$/g, in a yield of about 18%.

EXAMPLE 4

A distillation residue from the production of aromatic diisocyanates was treated with 20 wt.% of binder pitch and then transformed after extruding to spherules of 0.6 mm to 1.0 mm by a pelletizing process. The density of the spherules was about 1.1 g/cm$^3$, resulting in a bulk weight of about 850 g/liter. The polymer/pitch spherules were able to be pyrolyzed easily, without caking, in a laboratory rotary kiln, and at an end temperature of 785° C., pyrolysis residues of 50 to 60% were found. In the same rotary kiln they were then activated at 850° C. with 25% steam in a nitrogen atmosphere for 40 minutes. The result was an approximately round spherical carbon of good quality (BET surface: 1200 m$^2$/g; particle diameter: 0.55 mm to 0.85 mm) in a yield averaging 50% with respect to pyrolyzed material.

EXAMPLE 5

To a distillation residue from diphenyl methane diisocyanate production, 10% and 20% of inorganic adsorbers in powder form (aluminum oxide) was admixed. Water in amounts of 2 to 10% could easily be emulsified into this mixture. A material was obtained from which a spherical adsorber with special properties was made. By extruding the pasty mixture and pelletizing the approximately 0.5 mm thick strands spherules of a size of about 0.6 mm to 1 mm were made (of course, even larger spherules can be made by pelletizing, but those of diameters of 2 mm and under, especially 1 mm and under are practical). The moisture had an advantageous effect on the crosslinking process, because the spheres achieved a high strength without heating.

Then they were pyrolyzed in a fluidized bed at about 700° C. and activated at about 850° C. with steam. The spherules, about 0.4 mm to 0.8 mm in size, were obtained in a yield of 43%, and had an internal surface (BET) of about 1200 m$^2$/g and a pore volume of about 1 ml g to 1.3 ml g.

An interesting property of the end product is a high capacity for absorbing water. Even at 50% moisture the spherules were still free-flowing and in the extreme case they absorbed up to 100% water.

EXAMPLE 6

A coarse, open polypropylene fleece was wrung out with a polyisocyanate coating composition of Bayer AG (Levacast 43131 N) (wringing effect about 100%) and charged with the spherical adsorbers prepared according to the invention, from Example 7, whose moisture content was 50%. The latter yielded water to the polyisocyanate adhesive so that it crosslinked without thermal treatment, A filter mat resulted, with a charge of about 500 g of adsorbers per square meter, which was outstandingly suitable as an odor filter for vapor exhaust hoods. At the same time it was found that, with a high moisture input, the mat absorbed the moisture to yield it again at lower moisture input. In this manner it was possible to break down the "water vapor peaks" that occur in boiling, which condense on windows, mirrors, tiles and the like.

EXAMPLE 7

A residue from toluene diisocyanate production was treated with about 15 wt.-% of bitumen and, as described in the preceding examples, was made into spherules of 0.4 mm to 2 mm diameter containing 15 wt.-% to 20 wt.-% of nitrogen. The spherules were pyrolyzed in a rotary kiln to an end temperature of 750° C. (6.25° C. per minute up to 750° C., then 60 minutes at 750° C.), the yield amounting to about 50%. To avoid the formation of large amounts of a condensate in the exhaust ducts of the rotary kiln during the pyrolysis, the ducts were heated at 350° C.

Then, in a "vertical tubular kiln" made by Combustion Air, the product was activated at 850° C. for 65 minutes with a mixture of 25% water and 75% nitrogen to an internal surface area of 1050 m$^2$/g. The total yield fell to 23%. The bulk density was about 800 g/l and the particle size 0.3 mm to 0.75 mm.

An internal surface area (BET) of 1350 m$^2$/g to 1400 m$^2$/g was achieved by doubling the activation time, although the yield fell to 10% and the particle size was further reduced (0.25 mm to 0.6 mm).

What is claimed is:

1. A method of producing granular, active carbon, said method comprising the steps of:
    (a) processing a mixture comprising a distillation residue originating from diisocyanate production, and a carbonaceous working adjuvant to form free-flowing granules;
    (b) pyrolyzing the granules obtained in step (a); and
    (c) activating the pyrolyzed granules;
wherein the carbonaceous working adjuvant is selected from the group consisting of high-boiling hydrocarbons, hydrocarbon mixtures, pitches, thermoplastic polymers, distillation residues from petroleum processing, and mixtures thereof.

2. A method according to claim 1, wherein the distillation residue has a ratio of aromatic carbon atoms to total carbon atoms $C_{aromatic}/C_{total}$ of at least 0.6 and a nitrogen content of at least about 10 wt.-%.

3. A method according to claim 2, wherein the distillation residue contains a ratio of aromatic carbon atoms to total carbon atoms $C_{aromatic}/C_{total}$ between 0.6 and 0.9.

4. A method according to claim 1, wherein the pyrolyzing of step (b) and the activating of step (c) are carried out in the same apparatus in direct succession.

5. A method according to claim 2, wherein the distillation residue has a nitrogen content in the range from about 10 wt.-% to about 20 wt.-%.

6. A method according to claim 1, wherein the distillation residue originates from the production of at least one diisocyanate selected from the group consisting of toluene diisocyanate, 4,4'-methylene di-(phenyl isocyanate), diphenylmethane diisocyanate and 1,5-naphthalene diisocyanate.

7. A method according to claim 1, wherein the mixture of step (a) contains from about 10 wt.-% to about 85 wt.-% of an aromatic diisocyanate derivative.

8. A method according to claim 1, wherein an inorganic adsorbent is added to the mixture in step (a).

9. A method according to claim 1, wherein water is added to the mixture of step (a).

10. A method according to claim 10, wherein at least a portion of the added water is present in the carbonaceous working adjuvant.

11. A method according to claim 10, wherein water is present in the mixture of step (a) in an amount from about 2 wt-% to about 10 wt.-%.

12. A method according to claim 1, wherein the processing of step (a) is effected by the application of shear forces by stirring the mixture as viscosity thereof increases until free-flowing granules are obtained.

13. A method according to claim 1, wherein the free-flowing granules obtained in step (a) have diameters in the range from about 0.1 mm to about 2.5 mm.

14. A method according to claim 1, wherein the pyrolysis in step (b) is performed in an inert or slightly oxidizing atmosphere, at temperatures up to about 800° C.

15. A method according to claim 14, wherein the pyrolysis is performed in a substantially inert atmosphere containing from about 0.2 vol.-% to about 4 vol.-% oxygen.

16. A method according to claim 14, wherein the pyrolysis of step (b) produces internal surfaces of up to 500 $m^2$/g in the pyrolyzed granules.

17. A method according to claim 1, wherein the activating in step (c) is carried out at temperatures in the range from about 700° C. to about 900° C.

18. A method according to claim 17, wherein the activating in step (c) is carried under a substantially inert atmosphere to which at least one activating gas selected from the group consisting of air, carbon dioxide and steam has been added.

19. A method of producing granular, active carbon, said method comprising the steps of:
    (a) processing a mixture comprising a distillation residue originating from diisocyanate production, and a carbonaceous working adjuvant to form free-flowing granules;
    (b) pyrolyzing the granules obtained in step (a); and
    (c) activating the pyrolyzed granules;
wherein an inorganic adsorbent is added to the mixture in step (a), and said inorganic adsorbent is selected from the group consisting of silicon oxides, silica, silicic acid, bleaching earths, molecular sieves, bentonites and aluminum oxides.

20. A method of producing granular, active carbon, said method comprising the steps of:
    (a) processing a mixture comprising a distillation residue originating from diisocyanate production, and a carbonaceous working adjuvant to form free-flowing granules;
    (b) pyrolyzing the granules obtained in step (a); and
    (c) activating the pyrolyzed granules;
wherein an inorganic adsorbent is added to the mixture in step (a), and the inorganic adsorbent is impregnated with a catalytically active metal.

21. A method of producing granular, active carbon, said method comprising the steps of:
    (a) processing a mixture comprising a distillation residue originating from diisocyanate production, and a carbonaceous working adjuvant to form free-flowing granules;
    (b) pyrolyzing the granules obtained in step (a); and
    (c) activating the pyrolyzed granules;
wherein the amount of carbonaceous working adjuvant in the mixture of step (a) is about 5 wt.-% to about 50 wt.-% of said mixture.

22. A method of producing granular, active carbon, said method comprising the steps of:
    (a) processing a mixture comprising a distillation residue originating from diisocyanate production, and a carbonaceous working adjuvant to form free-flowing granules;
    (b) pyrolyzing the granules obtained in step (a); and
    (c) activating the pyrolyzed granules;
wherein at least one emulsifier is added to the mixture in step (a).

23. A method according to claim 8, wherein the activated granules contain from about 20 wt.-% to about 80 wt.-% inorganic material.

24. A method of producing granular, active carbon, said method comprising the steps of:
    (a) processing a mixture comprising a distillation residue originating from diisocyanate production, and a carbonaceous working adjuvant to form free-flowing granules;
    (b) pyrolyzing the granules obtained in step (a); and
    (c) activating the pyrolyzed granules;
wherein at least one material selected from the group consisting of plastic, plastic waste and polymers is added to the mixture in step (a).

25. A method according to claim 24, wherein the plastic, plastic waste or polymer is added in an amount from about 10 wt-% to about 30 wt.-% based on the weight of the mixture.

26. A method of producing granular, active carbon, said method comprising the steps of:
    (a) processing a mixture comprising a distillation residue originating from diisocyanate production, and a carbonaceous working adjuvant to form free-flowing granules;
    (b) pyrolyzing the granules obtained in step (a); and
    (c) activating the pyrolyzed granules;
wherein the processing of step (a) is effected by extrusion and pelletizing to obtain free-flowing granules.

* * * * *